(12) United States Patent
Ray et al.

(10) Patent No.: US 8,375,440 B2
(45) Date of Patent: Feb. 12, 2013

(54) SECURE BAIT AND SWITCH RESUME

(75) Inventors: Kenneth D. Ray, Seattle, WA (US);
Kevin M. Litwack, Seattle, WA (US);
David R. Wooten, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 750 days.

(21) Appl. No.: 11/872,220

(22) Filed: Oct. 15, 2007

(65) Prior Publication Data

US 2009/0100516 A1    Apr. 16, 2009

(51) Int. Cl.
*G06F 21/00* (2006.01)
(52) U.S. Cl. ......................................... 726/19
(58) Field of Classification Search .............. 726/19; 713/2
See application file for complete search history.

(56) References Cited

U.S. PATENT DOCUMENTS

| 6,115,815 | A | 9/2000 | Doragh et al. | |
|---|---|---|---|---|
| 6,243,831 | B1 * | 6/2001 | Mustafa et al. | 714/24 |
| 6,523,125 | B1 | 2/2003 | Kohno et al. | |
| 7,451,484 | B1 * | 11/2008 | Nadalin et al. | 726/19 |
| 2005/0111664 | A1 | 5/2005 | Ritz et al. | |
| 2006/0041740 | A1 | 2/2006 | Hsu | |
| 2006/0155988 | A1 * | 7/2006 | Hunter et al. | 713/164 |
| 2008/0177994 | A1 * | 7/2008 | Mayer | 713/2 |

FOREIGN PATENT DOCUMENTS

| EP | 0658843 A1 | 6/1995 |
|---|---|---|
| WO | WO2006120365 A1 | 11/2006 |

OTHER PUBLICATIONS

Alexander, "BitLocker Drive Encryption in Windows Vista", at <<http://certcities.com/editorial/columns/story.asp?EditorialsID=213>>, Media Inc., 1996-2007, pp. 5.
"CompuSec PC Security Suite", retrieved on Jul. 11, 2007, at <<http://www.snapfiles.com/get/compusec.html, pp. 2.

* cited by examiner

*Primary Examiner* — Brandon Hoffman
*Assistant Examiner* — Anthony Brown
(74) *Attorney, Agent, or Firm* — Lee & Hayes, PLLC

(57) ABSTRACT

Procedures for resumption from a low activity condition are discussed. In implementations, a persistent state file, or a portion thereof, is secured via an encryption algorithm, with the decryption key secured via the operating system (OS) login user credentials. Once a user is authenticated via the OS login, the persistent state file may be decrypted and inserted in the OS boot path with resumption occurring through the persistent state file.

19 Claims, 3 Drawing Sheets

SECURE BAIT AND SWITCH RESUME

BACKGROUND

Hibernation allows computer systems to enter a limited activity mode in which the system hardware is "resting". During hibernation, system hardware is configured to await an input which triggers the hardware to return to normal computing. During hibernation, active processes may be suspended until an event causes the system to become active or awaken. For example, a laptop computer may hibernate to conserve battery life when the laptop lid is closed. In other instances, desktop systems may hibernate after a designated period of inactivity. In the foregoing manner, the computer system may spin down the hard drive and shut down or otherwise incapacitate services in order to minimize system wear, save energy and so on.

When a computing system goes into a low activity mode, the system is usually awakened by a user entering an input (such as a keystroke) or the system receiving some other input (a laptop lid opening) which causes the system to become active or awaken from the low activity state. For instance, a computer awakening may result in the system running the previously active applications and services.

Hibernation may raise security issues, as a system resuming operation or coming out of hibernation may permit unauthorized access to programs and data which were active prior to the system entering the lower activity state. In addition, unauthorized access may be attempted when the hibernation data is stored on disk. If, for instance, a computer resumes activity after hibernation, this action may permit unauthorized access. When coming out of hibernation, the system may awaken before overall OS security architecture is available.

SUMMARY

Procedures for resumption from a low activity condition are discussed. In implementations, a persistent state file, or a portion thereof, is secured via an encryption algorithm, with the decryption key secured via the operating system (OS) login user credentials. Once a user is authenticated via the OS login, the persistent state file may be decrypted and inserted in the OS boot path with resumption occurring through the persistent state file.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Accordingly, techniques are described to provide secure resumption from low activity. For example, when a computing system resumes from a limited activity state, resumption of normal computing may be accomplished in a secure and convenient manner. In the present discussion, a file, including user information collected as part of preparations for entering a limited activity configuration, may be included in the operating system (OS) login boot path so that a user logging in to an awakened computing system (via the OS login) may conveniently resume activities, while achieving user data security and computing system security.

In an implementation, a hibernation file, or a portion thereof, is encrypted and stored on a hard drive when the OS hibernates, such as by shutting down various hardware components. Hibernation may occur in response to an event, such as a period of inactivity or an input which indicates that low/limited activity is desired. A encrypt/decrypt key, used with the hibernation file, may be securely stored in a limited accessibility file. The key may be in data secured via user security credentials (e.g., password, user identification, a smart card, a personal identification number, user identification (ID)) and so on. For example, the key may be protected by user authentication credentials so that the OS/computing system is configured to limit access to verified users (i.e., having proper user's credentials). For example, the file containing the key may be secured with the OS login credentials. In implementations, the hibernation file may be encrypted or portions of the hibernation file may be encrypted.

Upon resuming operation, the OS or a portion of the OS, sufficient to insure a secure architecture, may be loaded into memory so that a user interface (UI) may be presented in order to authenticate a user's login. If the credentials are valid, decryption of the hibernation file may occur. In implementations, the encrypted hibernation file may be read to memory (e.g., random access memory (RAM)) prior to receiving user credentials. The resume procedure may be routed through the inserted hibernation file or other persistent state file. In the foregoing manner, the system may resume while insuring robust security in a convenient fashion.

Exemplary Environment

Figure 1:
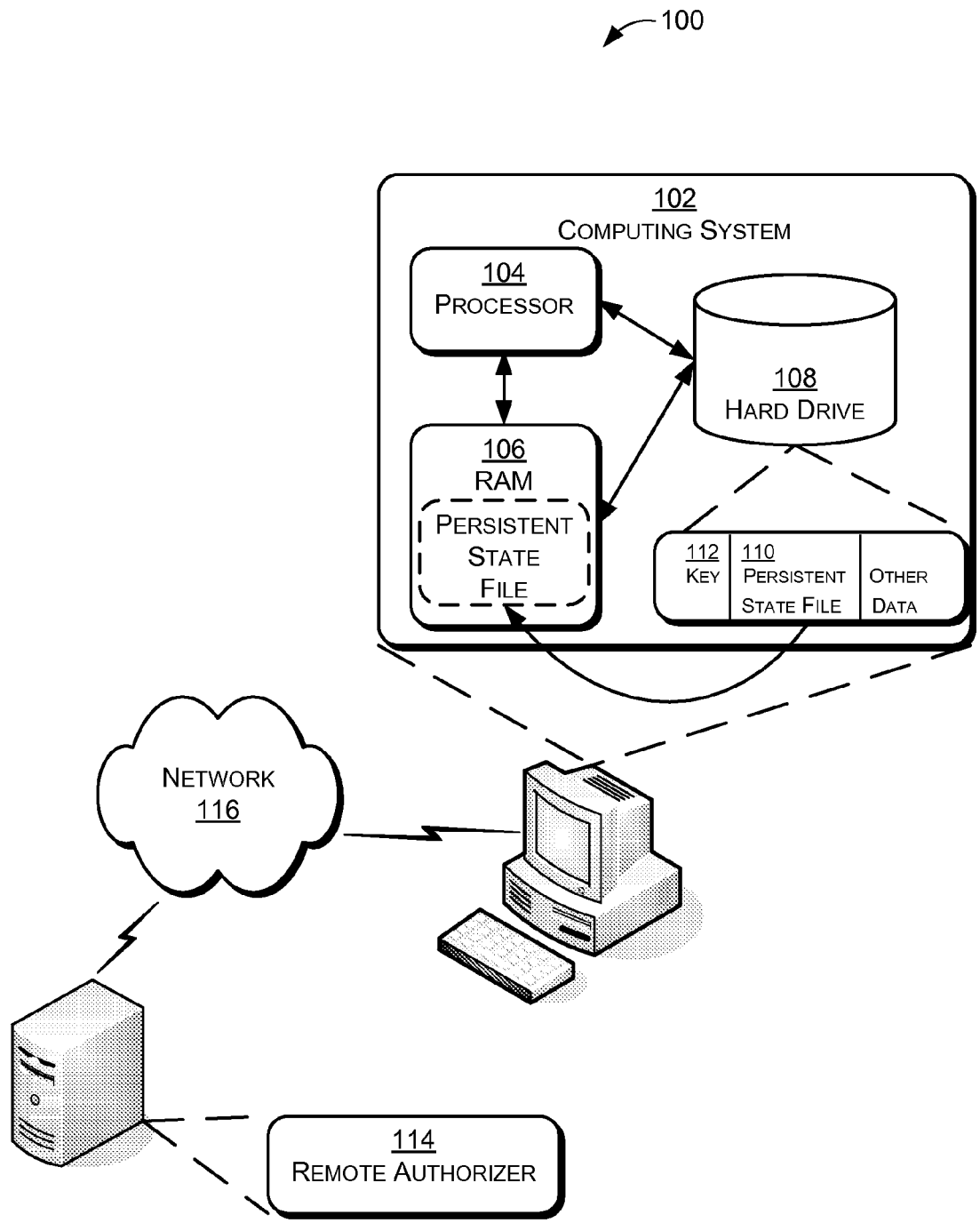
FIG. 1 illustrates an environment in an exemplary implementation that may use technologies to provide secure low activity resumption.

FIG. 1 illustrates an environment 100 in an exemplary implementation that is operable to provide secure resumption from a low activity state. For instance, the system and techniques may permit resumption from a low activity condition such as a sleep state (e.g., suspend to random access memory (RAM)). During a sleep condition, relevant data may be retained in RAM 106. During hibernation, data for resuming operation to the pre-hibernate condition may be stored on a hard drive 108 or other persistent storage medium. The techniques discussed herein may be used in conjunction with other low or limited activity levels as well. Various configurations and arrangements of data storage may be implemented in accordance with the principles discussed herein.

In the present instance, a system, such as a desktop computing system 102, a laptop, a server, or other device having processing capability (e.g., a processor) 104 may be configured to securely resume operation from a low activity state (such as hibernation). In other implementations, a computing system may be a virtual machine which is resident on one or more physical devices.

The computing system 102 may enter a low activity state to minimize power consumption, minimize hardware component wear, prevent unauthorized access and so on. As discussed above, resumption from a low activity condition may permit the computing system 102 to return to pre-low activity operation, as if the computing system 102 had not gone into the low activity state in which hardware computing services are unavailable. In a normal activity mode, the computing system 102 may be in a condition for receiving user input.

From a power management perspective, an "active" condition may be arbitrarily represented as a zero power level while a fully inactive state (i.e., the system "turned-off") may be a level 5. Low activity states may include, but are not limited to, a level 3 or level 4. In a low activity condition, system hardware such as hard drives, screens, peripheral device and so on may be "turned-off", placed in a limited activity state and so on. While some system components are rendered inactive, other components may remain active or various combinations thereof during a low activity period.

The low activity configuration may be triggered by a particular input (such as a key stroke combination or shutting a laptop lid), inactivity by a user (e.g., no mouse clicks have occurred in a give time period, and so on). In implementations, low activity states may be incrementally achieved or sequentially entered. For example, a computer may go to sleep if no entry is received in five minutes. The computing system 102 may subsequently hibernate if no input has been received in an additional two minutes. As noted above, the different limited activity levels may represent different combinations of one or more of the following: hardware being incapacitated, the level at which components are incapacitated, and so on.

In comparison to a low activity state or condition, if the computing system is shut down or becomes inactive, the operating condition of the computing system 102 at shut down may be lost as the computing system 102 commences operation from the start-up configuration, rather than the status of the computing system at shut down. The start-up condition may be the configuration of the computing system 102 resulting from the computing system executing a standard boot-up procedure. For example, upon restarting from an inactive configuration, the computing system 102 may have different applications or services running as part of the boot-up procedure, in contrast to the applications running when the computing system 102 was shut-down or entered a no-activity state.

Although hibernation is discussed herein, the principles discussed here may be applied to a wide variety of activity levels for hardware and/or software and so on.

As part of entering a low activity state, the computing system 102 may generate a persistent state file 110 (in the present example, a hibernation file) containing data collected for recommencing operation of the computing system 102 from the point at which the computing system 102 entered the low activity state. For instance, if the computing system is a laptop, the hibernation file may include data related to the active state of the OS, active applications, user data (which is currently being used or tied to active applications) and so on (and may include combinations of the foregoing data) which are collected in response to the lid of the laptop being closed. In this way, the condition of the computing system 102 may be "replicated" upon resuming normal computing activity.

The OS and application data for replicating the condition of the OS/computing system 102 may be retained in a separate file or in a segment (e.g., separated, partitioned or otherwise isolated from user data). Various portions of the hibernation file may be encrypted, while other data remains unencrypted. For example, user data may be encrypted, while OS related data may remain unencrypted. The foregoing situation may be compared with a full-volume encryption in which the entirety of the persistent state file 110 may be encrypted.

A laptop which enters a hibernation configuration because the lid is shut, may collect hibernation data for use in resuming activity if/when the computing system is awakened from hibernation. Upon collecting the hibernation data, the hibernation file, or a portion of the hibernation file, may be encrypted to secure the data, at which point, the computing system 102 may hibernate.

A key 112 for decrypting the encrypted hibernation data may be stored in a file protected by the OS login credentials. For example, the encryption/decryption key 112 is a "password" code formed of various characters (such as Unicode characters including numeric and special characters) which are implemented with a cryptographic algorithm to encrypt/decrypt data. A wide variety of cryptographic methods and algorithms may be used in conjunction with the present implementations. Instead of the key 112 being separately protected by a dedicated security protocol (e.g., identification, personal identification code and user name), using the OS login/credentials may permit a user to login to the OS and the hibernation file via a continuous operation. In the foregoing manner, the key 112 may be accessed and the hibernation file placed in the OS boot path (e.g., the files accessed upon receiving a valid OS login). Thus, the hibernation file may be protected and logging-in may grant access to the OS and the encrypted portions of the hibernation file. In implementations, the key may be passed to the resume process which may decrypt the persistent state file after the switch from the standard boot process.

For instance, the key 112 may be included in boot configuration data. In this manner, a computing system 102, resuming out of a low activity state, may load the OS, or a portion of the OS, into memory (e.g., RAM 106), receive a valid login in to the OS, which is accessed and then resumed from the hibernation file. The key 112 may be stored in a boot sector file on the hard drive 108, which is accessed during OS login. In other examples, the key 112/hibernation file may be retained on other hardware, included in a sector other than a boot sector, and so on.

Upon resuming from low activity, the OS may be loaded to a sufficient degree to achieve some degree of security and present or display a user interface (UI) for obtaining security credentials. Thus, a portion of the OS may be accessed so that the user interface for gaining entry to OS is presented.

Upon receiving valid credentials, the OS/computing system 102 may decrypt the encrypted portion of hibernation file. For instance, a user, who was active when the computing system 102 entered the low activity state, may login to the OS, which permits the OS to access the cryptographic key 112. As noted previously, in other instances the key may be passed to the switched path (e.g., through the persistent state file and then decryption may occur. In-turn, the key 112 may be used to decrypt the persistent state file 110. In other circumstances, valid users, who are not active when the computing system 102 entered the low activity state, may be permitted to login based on the OS/computing system's local policy.

Logging into the OS may include, but is not limited to, entering a user identification, using a smart card, entering a code, and so on. While a user may directly log on to the computing system 102, in additional examples a remote authorizer 114 may permit access. For instance, domain controller coupled to the computing system 102 via a network 116 may authorize access. In this way, a user may remotely login and awaken the computing system 102. In addition to users who were logged on the computing system 102 at hibernation, authorized personnel may be permitted to access the persistent state file 110.

In implementations, the persistent state file 110 may be read to memory (e.g., RAM 106) before authenticating a user or presenting the login user interface. As a result, decryption may occur once the credentials are validated, thereby minimizing the delay associated with loading data into memory. Thus, the computing system 102 may commence decryption, upon credential validation, instead of waiting for the data to be loaded into RAM 106 and then decrypting the content of the persistent state file 110. In other implementations, the persistent state file 110 may be loaded upon receiving valid user credentials.

Once decrypted, the OS may be rebooted or the computing system 102 may reset to the system configuration read from the hibernation file. An example of the latter case may reroute the OS boot path through the hibernation file with active applications and user data from the hibernation file read into memory.

As hibernation may be generally sensitive to changes in data storage, file rewriting and so on, the OS/computing system 102 may be configured to check for data consistency. System files may be copied to permit consistency checking. For example, a copy of the system files may be modified and the modified version utilized by the computing system 102 when resuming activities. In this manner, when operation of the computing system 102 is resumed, assumptions made about the location and/or content of system file data may be upheld. For example, if a particular portion of data was located on a drive at a certain physical address (upon entering the low activity state) the resumed OS/computing system 102 presumes the data is in the same location. Thus, the resumed computing system 102 may be updated with the modified copy to avoid corruption associated with changes to system files and/or other data.

If a page file including a page table which maps memory data to physical addresses is used, entering a low activity state may include making a copy of the file. The retained copy may be used during consistency checking with the original version. In additional circumstances, a page table may not be utilized.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory devices, e.g., tangible memory and so on.

The following discussion describes transformation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Exemplary Procedures

The following discussion describes a methodology that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. A variety of other examples are also contemplated.

Figure 2:
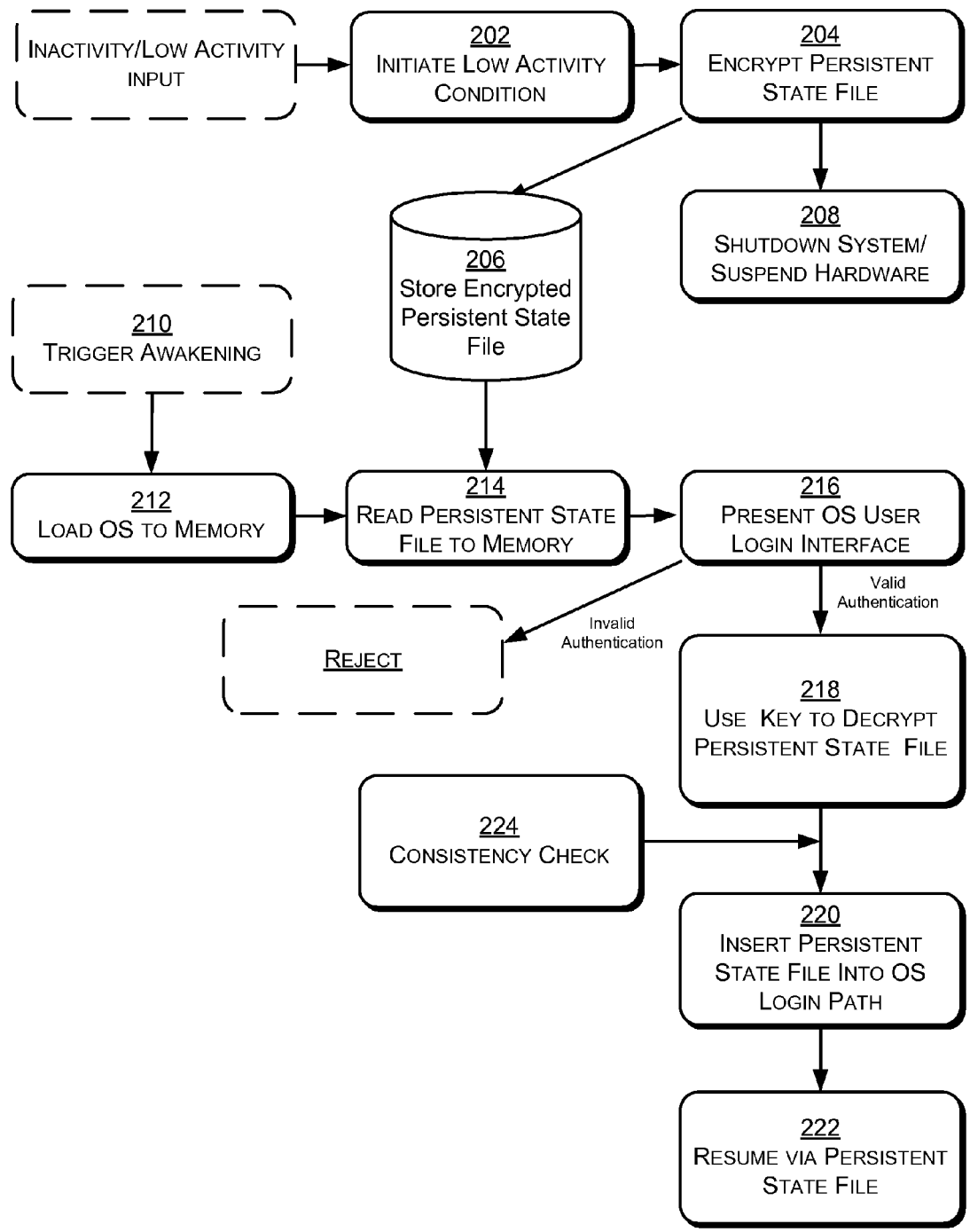
FIG. 2 is a flow diagram depicting a procedure in an exemplary implementation in which secure resumption is described.

FIG. 2 discloses an exemplary procedure for secure resumption from a low activity condition. The techniques discussed herein may be used to securely resume computing activity from a low activity condition. Examples of low activity conditions may include placing a computing system (which may be a virtual machine) having processing capability into a sleep mode, hibernation, and so on.

A computing system may initiate 202 preparations for entering a low activity state in response to receiving an input (or the occurrence of some event) which causes the OS and/or the computing device to prepare the hardware and/or software for entering a limited activity state. In other instances, a low activity configuration may be initiated 202 by inactivity. For example, a desktop may hibernate if no entry is received in ten minutes.

As part of configuring the hardware and software for limited activity, a persistent state file may be created and data relevant to resuming activity to the pre-low activity state may be included in the file. Relevant data may reflect a temporal snap-shot of a saved state of the running computing system at the time of the low activity event (e.g., as the computing system is entering low activity). For instance, a hibernation file may include OS configuration data, application data, user data, and so on (or combinations of the foregoing) in the hibernation file. System files and application files may be separated from user data within the hibernation file, in implementations.

The persistent state file or portions thereof, may be encrypted 204 in accordance with a wide variety of encryption algorithms, such based on an advanced encryption standard (AES) and so on. For instance, user data may be encrypted while data related to the OS or applications may remain unencrypted. The encryption/decryption key may be protected by the OS login credentials. For example, the key may be included in a file which is accessed by the OS in response to receiving user login credentials. In instances, the key may be included in boot configuration data which is secured by the user authentication credentials.

The low activity data, including encrypted portions, may be stored 206 for use when the computing system is awakened from the low activity state. For example, a hibernation file may be stored on a hard drive or other persistent memory included in or associated with a computing system implementing the present techniques. During a sleep state, a corresponding sleep file may be stored in RAM (i.e., operation suspended to RAM). While the hibernation file may be placed in various physical locations on the hard drive (which are mapped in the local file system), the hibernation file may be continuous so that the computing system does not have to search for portions of the hibernation file in a limited coding environment. In the foregoing manner, the system may be directed to the physical location of the data which is continuous rather than having to scan portions of the hard drive. The computing system may subsequently enter a low activity state 208 in which activities are suspended. In some situations, the computing system may even shutdown (e.g., become inactive).

Upon receiving a trigger 210, or on the occurrence of some event which causes the computing system to awaken (such as a keystroke), the OS, or a portion of the OS sufficient to provide security, manage accounts, or the like, may be loaded 212 in to memory.

In implementations, the hibernation file or portions of the hibernation file may be read 214 to memory prior to user authentication. For instance, upon awakening from a low activity state, the hibernation file, or part of the hibernation file, may be read 214 to RAM, so that, decryption may occur upon receiving valid user credentials. Reading encrypted persistent state files to memory prior to authenticating the user may lessen the time associated with resuming operation in comparison to an arrangement in which data is transferred subsequent to authenticating the user credentials. In other instances, OS data from the hibernation file may be read to memory, while encrypted portions are transferred upon receiving valid credentials. Reading and decryption may concurrently occur, such as in a first-in-first out (FIFO) manner.

An OS login may be presented via a user interface (UI) requesting login credentials 216. For instance, the user credentials may be that of a user who was active when the computing system entered hibernation. Exemplary credentials may include, but are not limited to, a smart card, a personal identification number (PIN), a user name and so on. Combinations of the foregoing are contemplated as well. In other instances, users may include authorized information technology personnel, and so on.

Upon receiving valid user authentication, the OS may implement the user credentials, which may be obtained during the OS login authentication, to access the key. The key may be used to decrypt 218 the encrypted portions of the persistent state file. Thus, the computing system may validate the user credentials for both the OS and the key which may be used in conjunction with the encryption algorithm to decrypt 218 the encrypted data in the persistent state file.

The persistent state file may be inserted 220 into the OS boot path so that the computing system resumes 222 operation as if the system had not experienced the low activity period. For example, instead of the OS/computing system following the normal boot cycle, which may occur on restarting the computing system from an inactive state, the boot path may be re-routed through the persistent state file during the resume process. In other implementations, the persistent state file may be decrypted once the OS boot path has been switched. The resume 222 process may proceed through the login portion of the OS boot path and then switch or be redirected to the hibernation file to configure the computing system to the state of the active system upon entering the low activity configuration. In this way, if particular applications were running prior to hibernation, the active applications are resumed 222 and the user data is reinstated to reflect the condition of the computing system upon entering the low activity state. As a result, the expected normal OS boot path is switched to reflect the hibernation file.

In implementations, the techniques discussed herein may include consistency checking 224. For example, a copy of system files may be modified to reflect changes which would conflict with system assumptions regarding the state of the file system upon resumption. The foregoing situations may include, modifications made as part of transitioning to a low activity state or during boot procedure. Modified copies of files may be merged as part of the resume process for use by the resumed OS/computing system. If a file was written to during boot and/or login, the changes may be made available to the OS/computing system when normal activity is resumed. For example, a page file may be copied (if one is used) so that changes to paged memory do not corrupt the memory image of the awakened computing system. In other instances, a page file may not be used.

Figure 3:
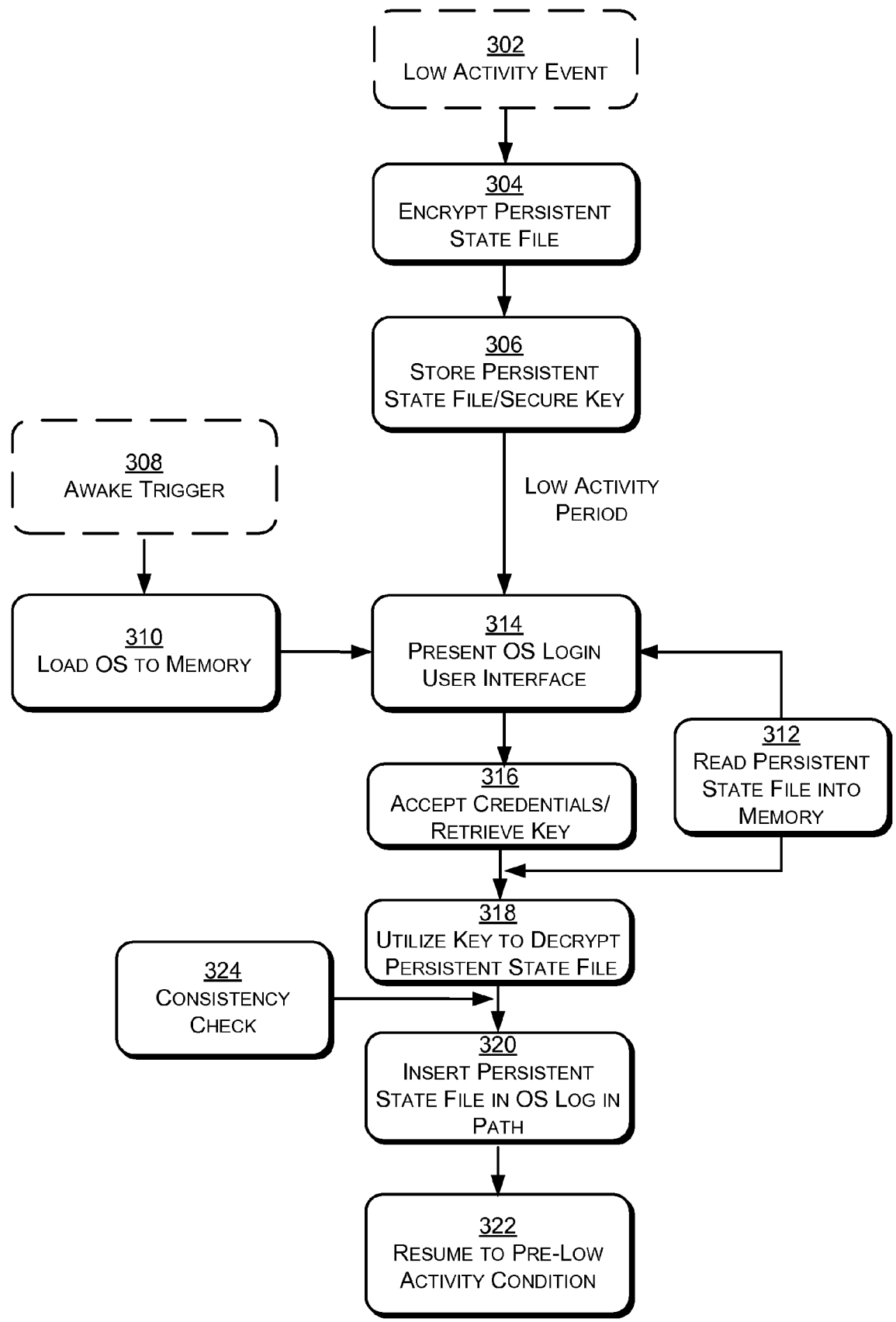
FIG. 3 is a flow diagram depicting a procedure in an exemplary implementation for providing secure resumption from a low activity state.

Referring to FIG. 3, a procedure and computer readable-media including computer-executable instructions that may direct a computer to perform the discussed procedure are discussed. The present techniques may be implemented when resuming out of a low activity state which may occur in response to a low activity event 302 such as inactivity for a given period or from an affirmative act (such as receiving a user input to enter hibernation).

In much the same fashion as described above, a persistent state file may be created and propagated with data for resuming operation of a computing system to the point at which the system entered a low activity configuration. For example, a hibernation file may capture a "snap-shot" of the state of the system upon entering hibernation. The persistent state file, or portions thereof, may be encrypted 304 using an encryption algorithm to secure the data. The persistent state file may be stored 306 and the key or code utilized to unlock the encrypted persistent state file may be in-turn secured via user credentials. For example, the key may be included in boot configuration data which is accessible via OS user login credentials. User credentials may be limited to authenticated credentials for one or more of: system users, remote authorizers, previously active users and so on as may be specified by the system's local policy.

The computing system may enter the specified low activity state in which portions of the computing system's hardware may become inactive. This period of low activity may be interrupted by receiving an awakening or resumption trigger 308 which may load 310 (at least partially) the OS into memory. For example, in response to receiving a keyboard input, a portion of the operating system related to generating a login user interface may be loaded 310 into memory.

The persistent state file may be read 312 into memory. For example, the persistent state file may be transferred into memory as the OS is loaded, while the OS login UI is presented 314 or subsequently, such as upon retrieving the key from the boot configuration data or from another file. Reading 314 or transferring the persistent state file in to memory may commence with encrypted data, while unencrypted data is transferred subsequently and so on as desired. For example, data related to the OS or formerly active application may be read into memory before user data. Other transfer sequences may be used as well.

Upon accepting valid or authenticated user credentials, the key may be retrieved 316 to decrypt 318 the encrypted portions of the persistent state file for resuming operation from the point of entering the low activity state. For example, upon receiving a valid OS user login, the key may be retrieved 316 from the boot configuration data and the persistent state file may be decrypted 318. In other instances, the OS boot path may be switched and the persistent state file decrypted. Decryption 318 may commence and continue as persistent state file data is transferred into memory, e.g., on a FIFO basis. Other sequences may be used as well.

The decrypted persistent state file may be inserted 320 into the boot path for the OS so that the configuration of the OS and related application, user data and so on may be resumed 322 to the condition upon entering the low activity state. In other instances, the computing system (which may include a virtual machine) may be rerouted through the persistent state file. For example, if the computing system reboots, a hibernation file may be included in the OS boot path so that operation resumes 322 from the hibernation file rather than following the reboot start-up procedure. In other instances, the persistent state file is utilized while resuming without executing a reboot.

In implementations, the techniques discussed herein may include performing a consistency check 324. For example, if a page file, including a page table, is used, a copy of the page file may be modified to reflect changes which may affect computing system/OS assumptions in order to minimize conflicts for the resumed computing system. Other techniques may be used as well.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer-implemented method performed by a processor executing operational instructions stored in a memory of a computing device, the computer-implemented method comprising:
   loading, into the memory, a portion of an operating system (OS) that provides a secure architecture to enable authenticating OS login credentials;
   receiving the OS login credentials;
   in response to authenticating the OS login credentials using the portion of the OS, rerouting booting the OS through a persistent state file that comprises:
      a temporal snap-shot of a state of the operating system captured in response to a low activity event; and
      a page file that maps memory data to physical addresses;
   retrieving a key stored in a boot sector file, the key stored in response to the low activity event, the boot sector file secured by the login credentials;
   utilizing the key for decrypting at least a portion of the persistent state file which was encrypted in response to the low activity event; and
   inserting the persistent state file in a boot path of the OS, permitting login to the OS and the persistent state file via a continuous operation.

2. The computer-implemented method as described in claim 1 further comprising reading at least a portion of the persistent state file into the memory before receiving the login credentials.

3. The computer-implemented method as described in claim 1 wherein decryption occurs upon at least one of receiving a valid user authentication from a user active at the low activity event or switching to the persistent state file.

4. The computer-implemented method as described in claim 1 wherein the persistent state file is resident in at least one of random access memory (RAM) or a hard drive prior to inserting.

5. The computer-implemented method as described in claim 1 further comprising redirecting resumption of active operation of a computer system from a normal OS boot path to the persistent state file if a persistent state file is available.

6. The computer-implemented method as described in claim 1 wherein the persistent state file includes a page file.

7. The computer-implemented method as described in claim 1 further comprising resuming operation of a computer performing the method from the persistent state file in which the persistent state file captured the activity state of the computer at the low activity event.

8. The computer-implemented method as described in claim 1 wherein the key is stored in boot configuration data secured by the login credentials.

9. One or more computer-readable storage media comprising computer-executable instructions that, when executed by a processor, cause the processor to:
   load a portion of an operating system (OS) that includes a secure architecture to authenticate a set of user credentials;
   receive the set of user credentials after loading the portion of the OS;
   read a persistent state file, that includes encrypted user data for resuming a computing system from a low activity condition, the persistent state file comprising:
      an active state of the computing system prior to entering the low activity; and
      a page file that maps memory data to physical addresses;
   validate the set of user credentials used for the computing system via the portion of the OS;
   rerouting booting the OS through the persistent state file;
   retrieve a key stored in a boot sector file that is secured by the set of user credentials; and
   decrypt the persistent state file based on the key and based on an encryption algorithm to resume operation of the computing system to the low activity condition, the key stored in the boot sector file when transitioning from the low activity condition to a low activity condition.

10. The one or more computer-readable storage media as described in claim 9 wherein the low activity condition is at least one of a hibernate state or a sleep state.

11. The one or more computer-readable storage media as described in claim 9 wherein the persistent state file is a hibernation file containing a page file.

12. A system comprising:
   a processor; and
   a computer-readable storage device to store instructions that are executable by the processor to:
      load a portion of an operating system (OS) that enables a secure architecture for authenticating user credentials;
      receive the user credentials via the portion of the OS;
      in response to authenticating the user credentials using the portion of the OS, rerouting booting the OS through a persistent state file, the persistent state file comprising:
         a temporal snap-shot of a state of the operating system captured prior to entering a low activity event; and
         a page file that maps memory data to physical addresses;
      retrieve a key for decrypting a hibernation file retained in boot configuration data stored in a boot sector file, the boot sector file secured by the user credentials;
      decrypt the hibernation file based on the key; and
      insert the decrypted hibernation file into the boot path of the OS in response to receiving the user credentials, the user credentials corresponding to a user who was active when the system entered a low activity condition.

13. The system of claim 12, wherein the boot configuration data is secured by the user credentials.

14. The system of claim 12 wherein the system is configured to read the hibernation file at least partially into the memory prior to receiving the valid user credentials.

15. The system of claim 12 wherein the system incrementally entered the low activity condition.

16. The system of claim 12 wherein the system sequentially entered the low activity condition.

17. The computer-implemented method of claim 1, the method further comprising:
   performing a data consistency check before loading the portion of the OS that provides the secure architecture.

18. The computer-implemented method of claim 1, wherein the persistent state file includes one or more system files.

19. The computer-implemented method of claim 18, further comprising:
   creating a copy of the one or more system files in response to the low activity event; and
   modifying the copy of the one or more system files to create modified system files, the modified system files used when rerouting booting the OS through the persistent state file.

* * * * *